United States Patent [19]
Venzi et al.

[11] Patent Number: 5,348,801
[45] Date of Patent: Sep. 20, 1994

[54] TAPE FOR REINFORCING PRESSURE-SUPPORTING HOLLOW BODIES AND A METHOD FOR REPAIRING DETERIORATED PIPES

[75] Inventors: Stefano Venzi, Rome; Adalberto Colombo, Paullo, both of Italy

[73] Assignee: SNAM S.P.A., Milan, Italy

[21] Appl. No.: 62,546

[22] Filed: May 18, 1993

[30] Foreign Application Priority Data

May 22, 1992 [IT] Italy .................. MI92 A 001243

[51] Int. Cl.$^5$ .................. B32B 7/12; B65H 81/06
[52] U.S. Cl. .................. 428/354; 428/246; 428/247; 428/251; 428/353; 428/355; 428/356; 138/97; 138/99
[58] Field of Search .............. 428/354, 246, 247, 343, 428/356, 355, 353, 40, 251; 138/97, 99

[56] References Cited

U.S. PATENT DOCUMENTS

| | | | |
|---|---|---|---|
| 3,321,357 | 5/1967 | Kennedy | 428/109 |
| 4,303,724 | 12/1981 | Sergeant et al. | 428/229 |
| 4,304,813 | 12/1981 | Elmore, Jr. | 428/354 X |
| 4,349,599 | 9/1982 | Adams | 428/354 X |
| 4,514,245 | 4/1985 | Chabrier | 156/161 |
| 4,626,306 | 12/1986 | Chabrier et al. | 156/180 |
| 4,636,427 | 1/1987 | Ohno et al. | 428/246 |
| 4,668,576 | 5/1987 | Yatsuya et al. | 428/354 X |
| 4,778,703 | 10/1988 | Fontanilla | 428/354 X |
| 4,937,111 | 6/1990 | Fontanilla | 428/354 X |
| 4,973,517 | 11/1990 | Lammers et al. | 428/354 |
| 4,983,449 | 1/1991 | Nee | 428/246 X |
| 5,162,150 | 10/1992 | Buis et al. | 428/247 X |
| 5,208,103 | 5/1993 | Miyamoto et al. | 428/354 |

FOREIGN PATENT DOCUMENTS 0184980 6/1986 European Pat. Off. .
1349852 4/1974 United Kingdom .

OTHER PUBLICATIONS

JP-A-57 125 280 (Nitto Electric Ind KK) 4 Aug. 1982 (Abstract).

*Primary Examiner*—Daniel Zirker
*Attorney, Agent, or Firm*—Oblon, Spivak, McClelland, Maier & Neustadt

[57] ABSTRACT

A method for repairing and reinforcing pressure-supporting hollow bodies, in particular deteriorated underwater pipelines, using a tape formed from a plurality of layers.

11 Claims, 3 Drawing Sheets

TAPE FOR REINFORCING PRESSURE-SUPPORTING HOLLOW BODIES AND A METHOD FOR REPAIRING DETERIORATED PIPES

This invention relates to a multi-layer tape for repairing and reinforcing pressure-supporting hollow bodies and a method for its application, particularly in the underwater pipeline repair field. The problem of repairing pressure-supporting hollow bodies, particularly pipelines and pressure vessels, is well known to the expert of the art.

With particular reference to pipelines, these are formed from lengths of metal pipe welded together. The continuous pipeline formed in this manner is then laid in its final seat. Although comprising protection against wet corrosion (moisture being present both in the case of underground pipelines and, obviously, in the case of underwater pipelines), the covering materials used are not without a certain permeability and in addition degrade to a certain extent with time. Moreover, the actual procedure involved in applying the covering, the laying and the possible reburying of the pipeline can themselves cause slight damage to and/or separation of the covering. Corrosion can therefore be triggered able to result in serious damage to the pipeline. Other damage can derive from natural phenomena such as earthquakes or landslips.

Various methods for repairing damaged sections have been proposed and practised in the known art.

Of these, the most radical method is to replace the damaged section by removing the metal pipe piece in which the damage has occurred and inserting a new pipe piece in its place, hence basically repeating the procedure used in constructing the pipeline. This method has considerable drawbacks because it is very difficult, is costly, is not always possible to achieve, and puts the entire pipeline out of operation for a long period. Alternatively a composite thermoplastic tape can be applied after preheating with a bare flame or a jet of hot air, which by softening the tape matrix to be applied makes it possible to bond the various tape layers required to provide mechanical strength to the body to be repaired. This system, which is advantageous because it does not require interruption of normal pipeline operation, has other drawbacks. In this respect, the adhesion of the tape to the pipeline is insufficient, so that the method requires a suitable primer for improving the adhesion of the thermoplastic tape to the pipe.

There is also great difficulty in heating the pipe to a suitable temperature (180° C.-200° C.) because of its considerable thermal conductivity, and if repairing operating pipelines in the field it is not always possible to provide the necessary sources of heat. If an orbiting machine were to be constructed for field repairs, the machine would be penalized in terms of weight and dimensions by the need to install heating means, such as a suitable number of gas cylinders, on the rotating part which applies the tape. This method as described is evidently not applicable to the repair of underwater pipelines.

For the repair of underwater pipelines, GB-A 2,080,475 describes a method using a two-part housing which is welded to the pipe in proximity to the defect. Epoxy resin is then pumped into the housing until it is completely full. After a certain time period, required for the hardening of the resin, the pipeline is again put under pressure. The main drawback of this method is the need to interrupt pipeline operation. In addition the method is suitable only for repairing small non-penetrating holes or small fractures. A method has now been found for reinforcing pressure-supporting hollow bodies which consists of wrapping the defective pipe with various layers of a particular tape without using primers or heat sources. The method is not only convenient for repairing underground pipes but is particularly advantageous for underwater pipelines.

Said tape has the considerable advantages of being easily applicable cold to the pipe even in the presence of water, and of adhering properly to the pipe to create a barrier against corrosion.

In accordance therewith the present invention firstly provides a multi-layer tape for reinforcing pressure-supporting hollow bodies, consisting of:

a) a first flexible layer of composite material consisting of fibres contained within a polymer matrix;
b) a second adhesive layer;
c) a third layer consisting of a plastic support film;
d) a fourth adhesive layer.

In a preferred embodiment, a thin layer of primer is provided on the outer surface of the multi-layer tape of the present invention to improve tape/tape adhesion.

Figure 1:
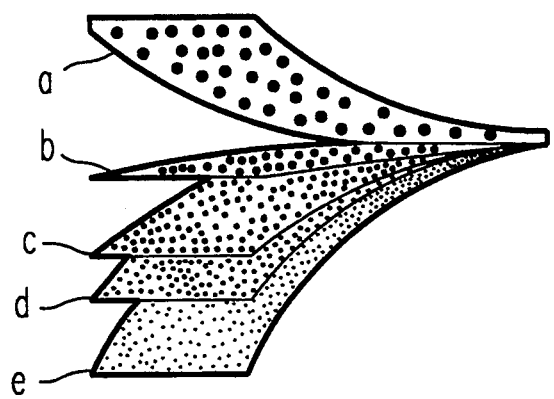
FIG. 1 shows an embodiment of the multilayer tape of the invention.

The tape of the present invention, which in the preferred embodiment has a width of between 8 and 20 mm, has an overall thickness of between 0.5 and 2 mm, preferably between 0.8 and 1.5 mm and more preferably between 0.9 and 1.2 mm.

The flexible layer of composite material a) is a web having high mechanical properties, consisting of continuous unidirectional fibres contained within a thermoplastic resin, the weight content of the fibrous part being at least 50 wt % and preferably at least 70 wt %. The preparation of these materials is described in U.S. Pat. No. 4,626,306, and a relevant application (as material for reinforcing pressure-supporting hollow bodies such as pipes and vessels) is reported in U.S. Pat. No. 4,514,245.

The fibrous part of these composite webs is chosen from those fibres having a softening point exceeding that of the thermoplastic polymer, for example asbestos, glass, boron, carbon, graphite or aromatic polyamide fibres can be used.

The resin of this composite material can be polyamide, polyvinylchloride, polycarbonate or polyether resin or their mixtures, or any thermoplastic or thermosetting material.

In the preferred embodiment of the present invention the fibre of this composite material is of poly(p-phenyleneterephthalamide), better known by the brand name Kevlar 29, and the resin is an aliphatic polyamide, preferably nylon 12.

The purpose of the plastic film layer c) is to support the adhesive layers b) and d); in the preferred embodiment it is a polyolefinic film, preferably of polyethylene or polypropylene or their mixtures, suitably mixed with elastomers.

The purpose of the adhesive layer b) is to join the layer of composite material a) to the plastic support film c), and the purpose of the adhesive layer d) is to fix the tape of the present invention to the metal pipe.

Subsequent tape layers applied to the first tape layer encounter the adhesive d), against which their outer surface (with primer) a) is pressed.

The adhesive normally consists of elastomers such as virgin or regenerated butyl rubber either as such or halogenated, natural rubber, ethylene-propylene-diene (EPDM) terpolymers or styrene-butadiene rubber (SBR). The adhesive usually also contains adhesivating resins, polybutene oils, mineral fillers (such as calcium carbonate, kaolin, talc) and antioxidants based on sterically hindered phenols and/or phosphites. In the preferred embodiment the adhesive layer consists of butyl rubber as such with added adhesivating synthetic resins.

According to a further aspect of the present invention, the multi-layer tape according to the present invention can be conveniently prepared by joining together under cold or hot conditions:

a web of composite material consisting of fibres contained within a polymer matrix, and a biadhesive corrosion-protection web consisting of a support and two adhesive layers.

In the preferred embodiment, the multi-layer tape of the present invention is prepared by joining together an aliphatic polyamide web reinforced with aromatic polyamide fibres, more preferably a nylon 12 web reinforced with poly(p-phenyleneterephthalamide), and a biadhesive web consisting of a polyolefinic support and two adhesive layers.

A typical example of a biadhesive web is the tape marketed by Alta S.p.A. under the name of Altene TP1822, consisting of a stabilized polyolefin support and two adhesive layers consisting of butyl rubber with added adhesivating synthetic resins.

The composite material web and the biadhesive web can be joined together to provide a single tape or multiple tape (several tapes extending side-by-side and then separated by longitudinal cutting).

Before being joined to the biadhesive web, it is preferable for the composite material web to be soaked or spread with primer on one or two sides. This can be conveniently achieved by rolling with a wetting roller or by immersion.

The primers generally consist of solutions and/or suspensions in suitable preferably volatile solvents of adhesivating resins and elastomers, such as virgin or regenerated butyl rubber, either as such or halogenated, natural rubber, EPDM terpolymers or SBR rubber. Polybutene oils, bitumen, rosin, mineral fillers, antioxidants based on sterically hindered phenols and/or phosphates, and fungicides such as salicylanilide can be added to the solution.

In this manner, a thin primer layer remains on the outer surface of the multi-layer tape of the present invention, and is useful in improving tape/tape adhesion during pipe repair.

The tape of the present invention can be stored for a long period without problem provided the free adhesive layer is covered with a layer of silicone paper or film, preferably silicone paper, which is easily removable at the time of application.

It can be packaged in various forms, preferably in rolls. FIG. 1 shows the preferred embodiment of the multi-layer tape of the present invention:

a) is a composite Kevlar 29 and nylon 12 web, on the outer side of which a thin layer of primer is deposited;

b) is the adhesive layer consisting mainly of butyl rubber;

c) is the plastic support film consisting of a polyolefin;

d) is a further adhesive layer consisting mainly of butyl rubber;

e) is the protective layer of silicone paper, which is removed prior to use.

The tape of the present invention is spirally wrapped about the pipe by suitable wrapping machines or by hand and can be applied either in-plant or in-line.

It is advisable to previously clean the pipeline part to be repaired, for example by sand-blasting.

The multi-layer tape of the present invention can either be applied directly to the metal surface of the pipe, or be applied via primers to give increased adhesion.

Its application does not require a heat source, as is required in the case of conventional thermoplastic polymers. This has undoubted applicational advantages, particularly in the repair of pressurized pipes weakened by corrosion or by any external agent, whether installed on land or in water.

In accordance therewith the present invention also provides a method for repairing pressure-supporting hollow bodies installed either on land or in water, consisting of applying to the pressure-supporting body a multi-layer pretensioned tape consisting of:

a) a first flexible layer of composite material consisting of fibres contained within a polymer matrix;

b) a second adhesive layer;

c) a third layer consisting of a plastic support film;

d) a fourth adhesive layer.

In the preferred embodiment of the present invention, the multi-layer pretensioned tape carries a thin layer of primer on the surface of the first flexible layer a).

Said tape can be applied to the defective hollow body in situ without interrupting the gas or liquid flow and without the aid of a heat source.

The simplicity of application of the tape means that not only exposed or buried hollow bodies can be repaired, but also those immersed in water. This represents a considerable improvement compared with the known art.

The hollow body is wrapped by winding various partly superimposed layers of suitably tensioned multi-layer tape in the form of turns about said hollow body. It is preferable to operate with a traction machine which follows the contour of the body to be wrapped, which can be at rest or rotating.

The number of layers required to effectively repair the hollow body depends on the extent of its deterioration, however indicatively between 5 and 20 layers are usually sufficient. In the case of repairs to pipes, the wound turns can be multiple and slightly offset. As they are substantially perpendicular to the pipe axis they considerably increase resistance against circumferential forces.

In order to further increase the resistance of the pipe against circumferential and longitudinal forces, it is preferable that at least a part of the turns be wound obliquely to the axis of revolution of the pipe.

In this manner not only is the hollow body repaired, but a valid barrier against corrosion is also created.

Figure 2:
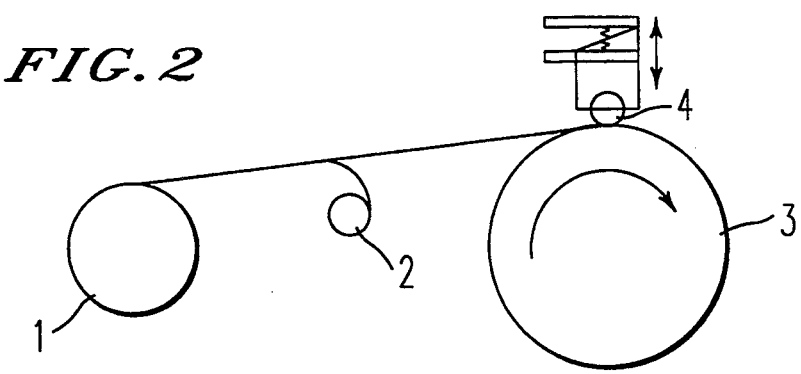
FIG. 2 is a representation of a scheme by which the multilayer tape of the invention is applied to a pipe.

FIG. 2 shows a possible scheme of application of the multi-layer tape of the present invention, in which: (1) is a reel of tape under controlled tension and serving as the tape stock; (2) is a device for removing the silicone paper; (3) is the pipe to be repaired; (4) is an operating head for effecting the adhesion.

As shown in FIG. 2, the tape reel (1) is mounted on an unwinder connected to a servomotor; the tension in the tape is controlled (generally between 50 and 250 kg), and the tape is passed through a device (2) for removing the protective layer, usually of silicone paper. For better adhesion against the surface of the pipe (3), the adhesive layer is finally made to adhere by mechanically pressing (4) with a pressure generally of between 25 and 50 kg/cm$^2$.

The following examples are given to provide a better understanding of the present invention.

EXAMPLE 1

Figure 3:
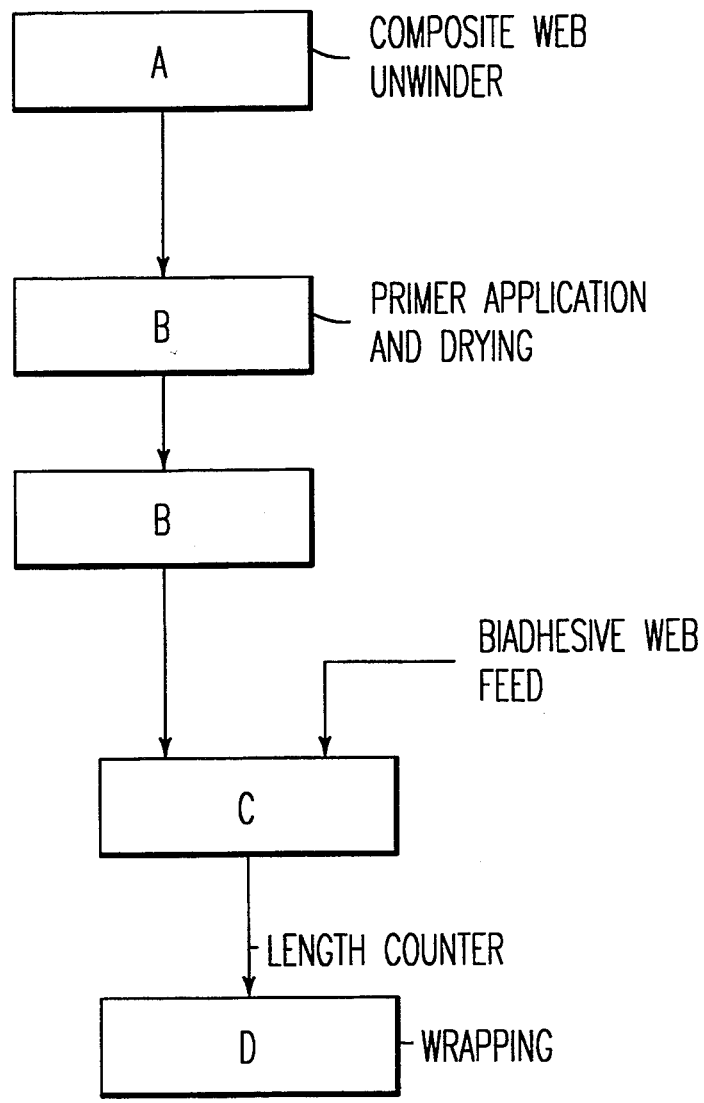
FIG. 3 is a scheme for preparing the multilayer tape of the invention.

FIG. 3 shows the operating scheme for preparing the multi-layer tape of the present invention on a laboratory scale. The plant comprises:

A: unit for unwinding the composite kevlar 29 and nylon 12 web;
B: unit for applying primer to, and then drying, the composite web;
C: unit for unwinding the Altene TP1822 web and applying it to the composite web;
D: unit for pulling and wrapping the final multi-layer tape.

The reel on which the composite web is wound is mounted on the unwinder and the web is unwound and passed manually through the various processing points until it reaches the wrapping section. With the web at rest, primer application is commenced (using AlteneP16 primer, which is a suspension of 16% butyl rubber in heptane) and the composite web is slowly passed through the primer drying region.

The composite web then reaches the region in which it is to be joined to the Altene TP1822 web, previously cut to the required size.

The two webs are then passed between two suitably shaped presser rollers, one below the primered composite web and the other above the Altene TP1822 web.

In this manner the multi-layer tape of the present invention is formed (width 12 mm, thickness 9 mm) and finally passes to the unit for its measurement and wrapping.

Figure 4:
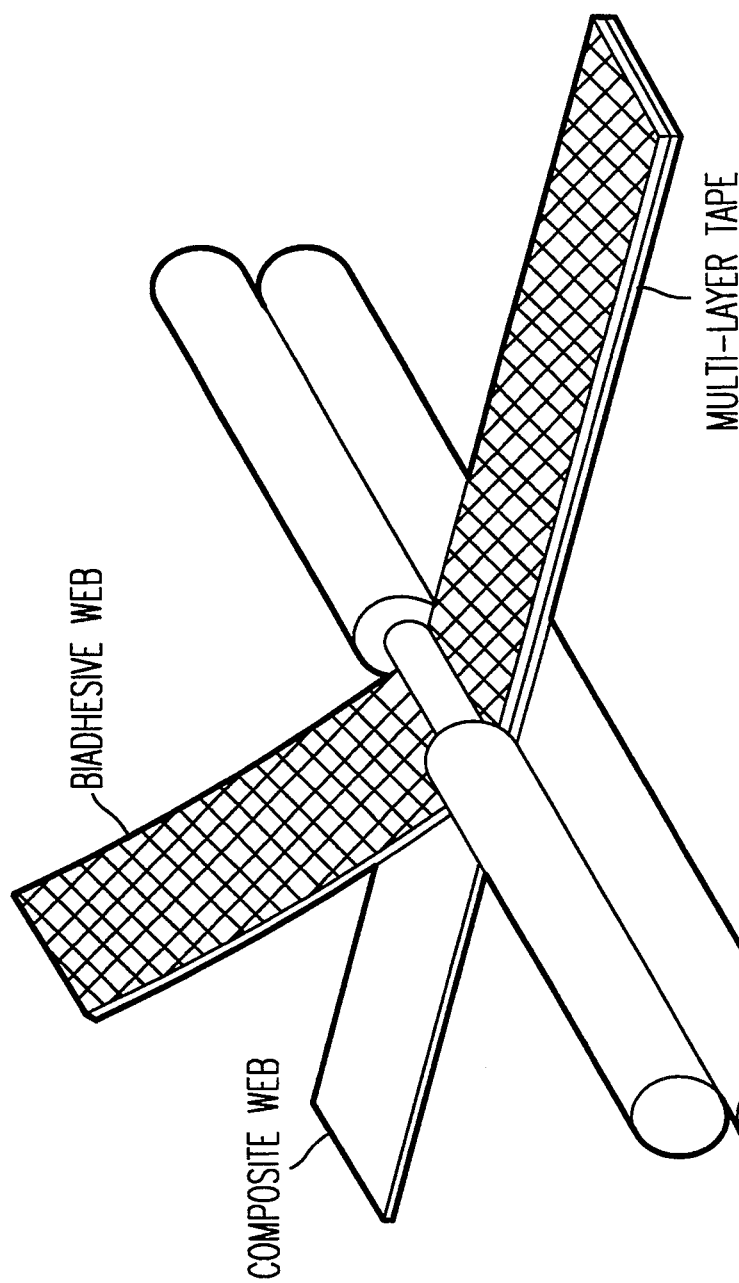
FIG. 4 shows the step of the process of FIG. 3 in which the biadhesive web and the composite web are bonded together by passage between two presser rollers.

FIG. 4 shows this latter processing stage, in which the webs are passed between two presser rollers to finally form the multi-layer tape.

EXAMPLE 2

A longitudinal defect having a length of 400 mm and a depth of about 80% of the wall thickness is artificially induced in an X60 steel pipe of length 3 meters, outer diameter 660 mm (24") and thickness 14.3 mm. A final test shows that the induced defect is unable to withstand pressure exceeding 60 bar.

The thus deteriorated pipe is subjected to multiple wrapping with 16 layers of the multi-layer tape applied under tension (140 kg) and a further 2 layers to gradually reduce the tension to zero. In total, the pipe is bound with a wrapping about 18 mm thick through a length of 1400 mm.

The purpose of this binding is to verify the exactness of the theoretical calculations regarding the effective increase in the pipe strength achieved by the applied reinforcement. In this respect, the number of layers and the tension imposed on the tape during wrapping are such as to apply an external pressure of 60 bar to the pipe. The pipe must therefore withstand an internal pressure of at least 120 bar.

The application is carried out in the presence of water to demonstrate the possible underwater use of the repair technique. Two extensions of the same thickness are welded to the pipe piece wrapped in this manner and to these there are welded two ends of greater thickness able to withstand a pressure of twice the bursting pressure of the wrapped pipe piece. The resultant structure is then pressurized in the following stages:

1) Three cycles of pressurization of the structure from 0 bar to the maximum operating pressure (MOP=75 bar) are carried out using degassed water.

Each cycle comprises maintaining the MOP, when reached, for about one hour with the exception of the last cycle, in which the structure is left at the MOP for about 12 hours.

2) On termination of the first stage the pressure is released and the structure raised to a pressure of 120 bar, the theoretical maximum strength.

3) The pressure is reduced to 0 bar, all the movable equipment is removed and the unit arranged for the next stage.

4) The test structure is pressurized until it bursts.

The following quantities were measured during the bursting test:

circumferential and longitudinal deformation at various points of the structure,
pressure,
water volume.

The structure bursts at a pressure of 145 bar, against the 60 bar theoretical bursting pressure of the unit without the wrapping with the tape of the present invention.

The results of this bursting test show the effectiveness of the repair method for deteriorated pipes, even in the presence of water, by applying the multi-layer tape of the present invention. The fact that bursting occurs at a pressure greater than that predicted confirms not only the validity of the applied theory, but also in particular the strength of the chosen repair system. Consequently, by increasing the number of tape wrapping layers, the internal pressure resistance of the pipe can be increased in accordance with the conditions under which the pipe is used or the safety margin to be attained.

We claim:

1. A multi-layer tape which maintains its structure in an apparatus which applies a tension of between 50 and 250 kg to the tape, for reinforcing pressure-supporting hollow bodies, comprising:

a) a first layer of profiled strips composed of continuous unidirectional fibers embedded in a thermoplastic resin, said fibers having a softening point exceeding that of the thermoplastic resin;
b) a second adhesive layer comprising rubber based compositions;
c) a third layer comprising a thermoplastic polymeric composition; and
d) a fourth adhesive layer comprising rubber based compositions.

2. The tape as claimed in claim 1, wherein a thin layer of primer is provided on the outer surface of the tape.

3. The tape as claimed in claim 1 or 2, wherein the tape has a width at a value ranging from 8 to 20 mm and a thickness at a value ranging from 0.2 to 2 mm.

4. The tape as claimed in claim 3, wherein the tape has a thickness of a value ranging from 0.8 to 1.5 mm.

5. The tape as claimed in claim 4, wherein the tape has a thickness of a value ranging from 0.9 to 1.2 mm.

6. The tape as claimed in claim 1, wherein the profiled strips are constituted of poly(p-phenyleneterephthalamide) fibers in an aliphatic polyamide resin.

7. The tape as claimed in claim 6, wherein the aliphatic polyamide resin is nylon 12.

8. The tape as claimed in claim 1 or 2, wherein the adhesive layers (b) and (d) are primarily comprised of butyl rubber mixed with an adhesion promoting synthetic resin.

9. The tape as claimed in claim 1 or 2, wherein the plastic support film (c) is a film of polyolefin mixed with elastomer.

10. A multi-layer tape which maintains its structure in an apparatus which applies a tension of between 50 and 250 kg to the tape, for reinforcing pressure-supporting hollow bodies, comprising:
   a) a first layer of profiled strips composed of continuous unidirectional fibers selected from the group consisting of asbestos fibers, glass fibers, boron fibers, carbon fibers, graphite fibers, and aromatic polyamide fibers embedded in a thermoplastic resin;
   b) a second adhesive layer comprising rubber based compositions;
   c) a third layer comprising a thermoplastic polymeric composition; and
   d) a fourth adhesive layer comprising rubber based compositions.

11. A method for repairing and reinforcing hollow, pressurized bodies which have deteriorated and which have been installed either on land or in water, comprising:
   wrapping said bodies with partially superposed layers of a pretension tape as described in claim 1 or 2.

* * * * *